United States Patent [19]
Muncke et al.

[11] 3,863,955
[45] Feb. 4, 1975

[54] PICK-UP-TYPE DRAWBAR ASSEMBLY

[75] Inventors: Ludwig Muncke, Morlenbach; Gerhard Gross, Wiesental; Josef Buchmüller, Mannheim, all of Germany

[73] Assignee: Deere & Company, Moline, Ill.

[22] Filed: May 7, 1973

[21] Appl. No.: 357,865

Related U.S. Application Data

[63] Continuation of Ser. No. 66,977, Aug. 26, 1970, abandoned.

[52] U.S. Cl. .................................. 280/479 A
[51] Int. Cl. ...................................... B60d 1/04
[58] Field of Search ........ 280/478 B, 479 A, 478 R, 280/479 R; 172/272

[56] References Cited
UNITED STATES PATENTS

| | | | |
|---|---|---|---|
| 2,926,931 | 3/1960 | Crampton | 280/479 A |
| 2,968,494 | 1/1961 | Klouda | 280/479 A |
| 2,983,523 | 5/1961 | Kienzle | 280/479 A |
| 3,361,446 | 1/1968 | Jeffs | 280/478 B |

FOREIGN PATENTS OR APPLICATIONS
312,730  7/1969  Sweden ........................ 280/479 A

*Primary Examiner*—Robert R. Song

[57] ABSTRACT

A drawbar assembly includes a drawbar which is suspended beneath a tractor for movement both vertically and fore-and-aft. A pair of hydraulic actuators are included in the drawbar suspension and are operative to move the drawbar from a raised transport position, wherein a draw hook at the rear end of the drawbar is disposed for towing a trailed vehicle, and a lowered position, wherein the draw hook is disposed downwardly and rearwardly from its towing position in a position for engaging the hitch of the vehicle to be towed. The drawbar is locked in the raised position by a pin, which in one embodiment is automatically hydraulically engaged in response to the drawbar reaching the transport position and which in a second embodiment is engaged by a hand-operated lever arrangement.

17 Claims, 6 Drawing Figures

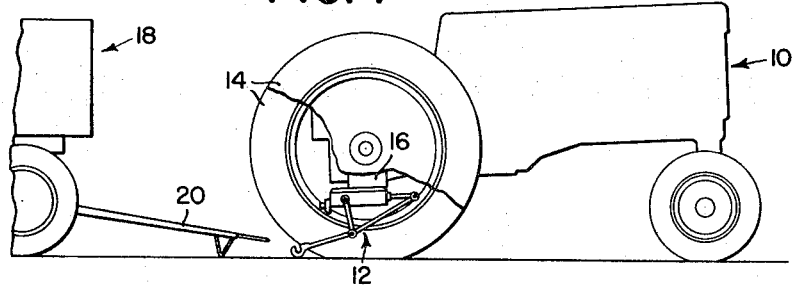
FIG. 1
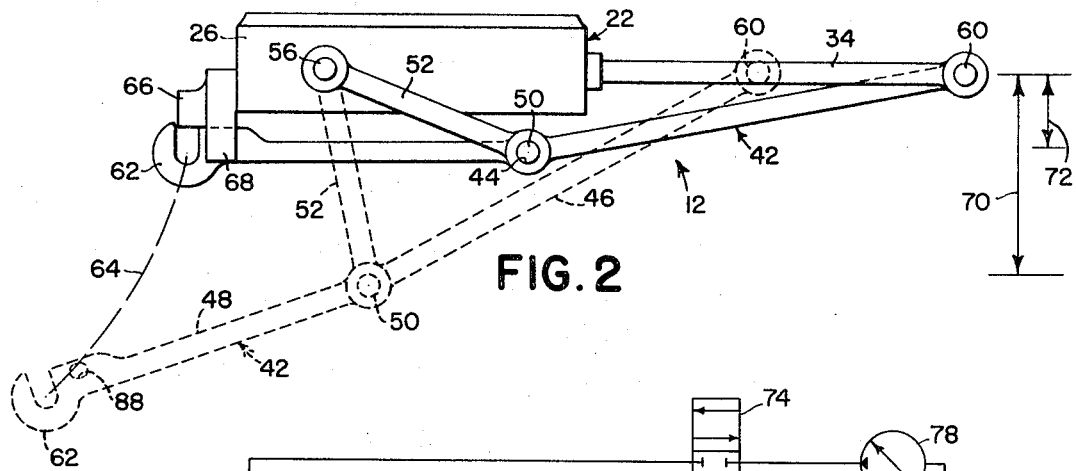
FIG. 2
FIG. 3
INVENTORS
LUDWIG MUNCKE
GERHARD GROSS
JOSEF BUCHMÜLLER

INVENTORS
LUDWIG MUNCKE
GERHARD GROSS
JOSEF BUCHMÜLLER

PICK-UP-TYPE DRAWBAR ASSEMBLY

This is a continuation of U.S. application Ser. No. 66,977 filed Aug. 26, 1970 now abandoned.

BACKGROUND OF THE INVENTION

The present invention relates to a drawbar assembly for attaching a vehicle, particularly a single-axle semitrailer, to a tractor, and including a draw hook which is mounted on a drawbar having the form of a two-armed lever and being adapted to move both horizontally and vertically between a lowered position wherein the draw hook may be engaged with a trailer hitch and a raised transport position.

A drawbar assembly of the above kind is known (West German Pat. No. 1,249,099), in which the draw hook is connected to the lifting arms of a tractor so as to be able to be raised and lowered, and is automatically locked in the raised position by a plate fastened to the tractor. The draw hook is at the end of a drawbar formed as a two-armed lever which is pivotally mounted between two parallel drawrods which are mounted in vertical guides and are raised and lowered by the power lift of the tractor. At its end remote from the draw hook, the drawbar carries a roller which, when the draw hook is liftingly engaged with a trailer hitch, bears against the underside of the tractor and rolls forwardly and rearwardly, respectively therealong, as the trailer hitch is raised and lowered. Although this device has certain advantages over other known constructions in which the draw hook is at the end of a drawbar formed as a two-armed lever pivotal about a fixed pivot instead of a movable pivot, it nevertheless has the disadvantages that the draw hook describes a path which does not correspond to the path described by a trailer hitch as it is raised, and which causes the trailer to be pushed rearwardly, and that the draw hook describes a path which positions it so as to be less visible from the driver's seat when the draw hook is in the lowered position than when the draw hook is in the raised position.

SUMMARY OF THE INVENTION

Accordingly, there is provided a novel tractor drawbar assembly, and more particularly there is provided a novel assembly including a drawbar formed as a two-armed lever pivotally mounted on a movable pivot.

A broad object of the invention is to provide a drawbar assembly constructed such that the draw hook will describe a path during raising which corresponds approximately to the path described by a trailer hitch as it is raised, and which path leaves the grab hook at least just as visible, as viewed from the driver's seat, when in the lowered position as when in the raised position.

A more specific object is to mount a drawbar in such a manner that the entire drawbar will move downwardly and rearwardly during the lowering thereof so as to insure visibility of the draw hook.

A further object is to provide a power lift for the drawbar and to arrange the power lift and the drawbar such that they are compact and leave adequate clearance beneath the tractor.

Another specific object is to provide a power lift which includes a pair of spaced, side-by-side, horizontally fixed, double-acting hydraulic cylinders disposed parallel to the longitudinal center plane of the tractor and which are pivotally connected to the forward end of the drawbar to move the forward end of the drawbar in a straight line located in the center plane of the tractor.

Still another object is to provide a drawbar which is connected to the hydraulic actuators in a manner which results in the pulling forces being cushioned by the fluid in the actuators.

Another object is to provide a locking bolt for selectively securing the drawbar in the raised transport position, and to provide a lost motion connection between the bolt and the drawbar so that draft forces are not borne by the bolt.

Another specific object is to provide an embodiment wherein the locking bolt is hydraulically inserted into the drawbar in response to the drawbar reaching the raised transport position, and to provide a second embodiment wherein the locking bolt is operated by a hand-operated linkage.

These and other objects will be apparent from the ensuing description and appended drawings.

BRIEF DESCRIPTION OF THE DRAWINGS

FIG. 1 is a diagrammatic side elevational view of a tractor having attached thereto a drawbar assembly constructed according to the principals of the invention and shown with the draw hook disposed in the lowered position for picking up a trailer hitch.

FIG. 2 is an enlarged side elevational view of the drawbar assembly showing the assembly in solid lines in the raised position and showing the assembly in dashed lines in the lowered condition.

FIG. 3 is a sectional view taken along the line 3—3 of FIG. 2 with the addition of a schematic showing the hydraulic circuitry.

DESCRIPTION OF THE PREFERRED EMBODIMENT

Figure 4:
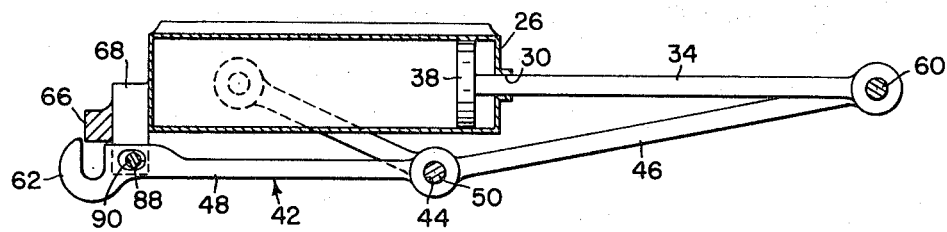
FIG. 4 is a sectional view taken along the line 4—4 of FIG. 3.

Referring now to FIG. 1, there is shown a tractor 10 having a drawbar assembly 12 fixed centered between a pair of rear wheels 14 on a transmission casing 16. A trailer 18 having a hitch 20 is positioned behind the tractor 10 and the drawbar assembly 12 is shown in a lowered condition for engaging the hitch 20.

The drawbar assembly 12 includes a pair of horizontal, fore-and-aft extending, double-acting hydraulic actuators 22 and 24 which are fixed to the transmission casing 16 and spaced in side-by-side relationship on the opposite sides of the longitudinal center plane of the tractor 10. The hydraulic actuators 22 and 24 respectively include cylinders 26 and 28 which are closed at their rear ends and which have respective sealed guide bushes 30 and 32 at their forward ends. A pair of piston rods 34 and 36 have a pair of pistons 38 and 40 mounted on their respective rear ends and are received in the guide bushes 30 and 32.

A drawbar 42 is suspended beneath and in the longitudinal center plane of the tractor 10. Intermediate the ends of the drawbar 42 is a transverse bore 44 which divides the drawbar into a forward arm 46 and a rearward arm 48. A transverse shaft 50 is received in the bore 44 and a pair of parallel cranks 52 and 54 have their opposite ends respectively pivotally connected to the shaft 50 and to a pair of pins 56 and 58 fixed to the opposite transverse sides of the cylinders 26 and 28. The drawbar 42 is caused to swing vertically and horizontally with the cranks 52 and 54 by means of the actuators 22 and 24 which are connected to the drawbar by means of a transverse shaft 60 which pivotally interconnects the forward ends of the piston rods 34 and 36 with the end of the forward arm 46 of the drawbar. A draw hook 62 is integral with the end of the rearward arm 48 of the drawbar and, as can best be seen in FIG. 2, is movable along a curved path 64 between a lowered, hitch-engaging position (shown in dotted lines) and a raised transport position (shown in solid lines) by alternate extension and retraction of the piston rods 34 and 36. When the draw hook 62 reaches the raised position, it contacts a stop 66 which is integral with a block 68 fixed to the rear ends of the cylinders 26 and 28. The stop 66 also acts as a keeper to prevent an engaged hitch from becoming disengaged from the draw hook.

It is to be noted that the drawbar 42, hence the forward and rearward arms 46 and 48, is swung about the transverse shaft 50 as a lever, as well as swung with the cranks 52 and 54 when the piston rods 34 and 36 are extended or retracted. The pivot axes defined by the transverse shafts 50 and 60 and by the pins 56 and 58, are located so as to be especially advantageous in raising a two-wheel vehicle hitch when the hitch is resting on the ground and supports a substantial amount of the vehicle load and weight. Specifically, when the drawbar 42 is in the lowered position, the force exerted by the piston rods 34 and 36 on the drawbar, through the transverse shaft 60, is multiplied through a leverage distance 70 and acts on the trailer hitch through the draw hook 62. As the trailer hitch is raised, the trailer is rocked about the axis of its wheels and consequently the amount of weight acting through the hitch on the draw hook decreases. Simultaneously, as the drawbar 42 is raised, the fulcrum point of the shaft 50 rises, thus, the leverage distance decreases until a minimum distance 72 is reached corresponding to the raised transport position of the drawbar.

It is to be noted that when the drawbar 42 is in the raised transport position, the arm 48 extends parallel to and slightly below the actuators 22 and 24 and the arm 46 is angled slightly upwardly from the arm 48 to the transverse shaft 60. Thus, the drawbar assembly 12 is constructed so as to be compactly arranged when in the raised, transport condition to insure sufficient working clearance beneath the tractor 10.

Extension and retraction of the piston rods 34 and 36 is accomplished by selectively shifting a control valve 74 to connect pressurized fluid supplied by a pump 78 to one or the other of a pair of work ports 80 and 82 at the respective rearward and forward ends of the cylinder 28 and to simultaneously connect the remaining work port to a reservoir 84. Fluid pressure in the respective work ports 80 and 82 is respectively connected to the corresponding rearward and forward ends of the cylinder 26 by means of a pair of conduits 84 and 86.

As a safety measure to insure against the loss of fluid pressure necessary to keep the drawbar 42 in the raised position, a transverse opening 88 is provided in the drawbar adjacent to the draw hook 62, and a locking bolt, fully described below, is received in the opening 88. The locking bolt may be hydraulically actuated, as illustrated in FIG. 5, manually actuated, as illustrated in FIG. 6, or may optionally be electromagnetically or pneumatically operated.

Figure 5:
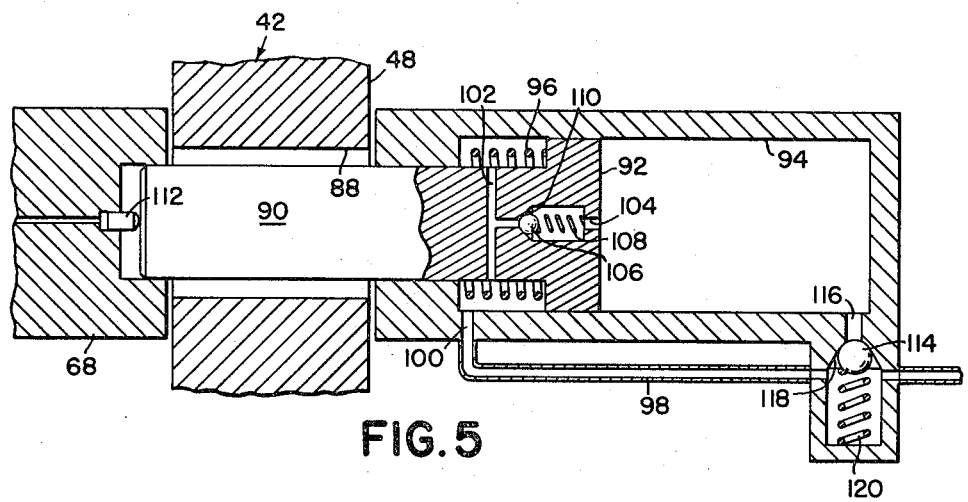
FIG. 5 is a partial enlarged sectional view taken along the line 5—5 of FIG. 3 of the first form of the invention showing the means for hydraulically operating the locking bolt.
Figure 6:
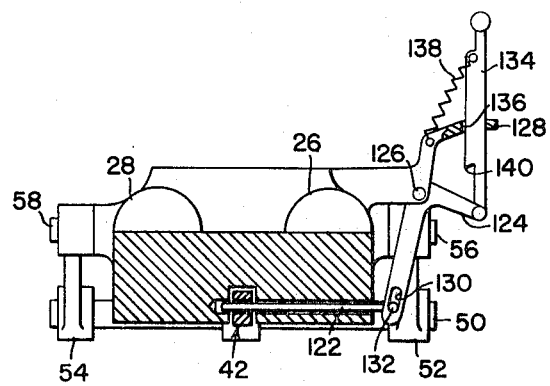
FIG. 6 is a rear elevational view, partially in section, of the second form of the invention showing the means for manually operating the locking bolt.

Referring now to FIG. 5, there is shown a hydraulically actuated locking bolt 90 received in the opening 88 and having a cylindrical end 92 slidably received in a cylindrical fluid chamber 94. As viewed in FIG. 5, the locking bolt 90 is continuously biased toward the right end of the chamber 94 and out of the opening 88 by means of a spring 96 acting between the left end of the chamber 94 and the head 92.

Engagement of the locking bolt 90 with the opening 88 is responsive to the drawbar 42 coming into contact with the stop 66. To this end, there is provided a conduit 98 which interconnects the supply conduit for the work port 80 of the cylinder 28 with an inlet port 100 at the left end of the chamber 94. A cross bore 102 is in the locking bolt 90 to the left of the head 92 and an axial bore 104 connects the bore 102 with the portion of the chamber 94 to the right of the head 92. A check ball 106 is biased by a spring 108 against a seat 110 in the axial bore 104. The check ball 106 thus remains seated and prevents flow between the left and right sides of the head 92 until the pressure in the portion of the chamber 94 to the left of the head 92 overcomes the pressure in the portion of the chamber 94 to the right of the head 92 plus the force exerted on the check ball by the spring 108. When the source of fluid pressure is connected to the work port 80 to extend the piston rods 34 and 36 to raise the drawbar, the portion of the chamber 94 to the left side of the locking bolt head 92 will likewise be pressurized. The spring 108 is selected so that the force exerted thereby will not be overcome by the normal range of fluid pressure required to raise the drawbar 42 when engaged with a trailer hitch. However, when the draw hook 62 contacts the stop 66, the pressure in the left ends of the cylinders 26 and 28 and consequently the pressure in the left end of the chamber 94 will increase and the check ball 106 will be unseated to permit the flow of pressurized fluid to the right end of the chamber 94. Because there is an area differential between the left and right faces of the head 92, the pressure will act to shift the locking bolt 98 to the left into the opening 88, as shown in FIG. 5. When the bolt 90 is fully inserted into the opening 88, the left end of the bolt will engage an electrical contact 112 and will complete a circuit (not shown) to light a lamp located adjacent the driver's seat.

The subsequent disengagement of the locking bolt 90 from the opening 88 is accomplished by connecting the work port 80, hence the conduit 98, to exhaust, whereupon the spring 108 will seat the check ball 106 and a check ball 114 located in an outlet port 116, interconnecting the right end of the chamber 94 and the conduit 98, will be urged off a seat 118 against the bias of a spring 120, by means of the fluid pressure in the right end of the chamber 94 generated by the action of the spring 96 on the locking bolt 90, to permit the exhaust of fluid from the chamber 94 to the right of the head 92.

It is to be noted that the actuators 22 and 24 are best suited for connection in a tractor hydraulic system of the closed center type so that the left sides of the pistons 38 and 40 may be continuously subjected to fluid under pressure when the draw hook 62 is in the raised, transport position. As can best be seen in FIG. 4, the opening 88 is elongated in the direction of travel so as to provide lost motion for the locking bolt 90 whereby draft forces applied to the draw hook 62 are transferred through the drawbar 42 to the piston rods 34 and 36, and are thus cushioned by the fluid in the cylinders 26 and 28 instead of being transferred to the locking bolt 90. Since the draft forces act against the fluid in the cylinders 26 and 28, the fluid pressure in the cylinders can be connected to the draft control system (not shown) of the tractor to raise the coupled vehicle, or the like, in response to increased draft loads to transfer weight to the rear wheels of the tractor and increase the traction.

Referring now to FIG. 6, there is shown a manually-operated locking bolt 122 which is inserted into the opening 88 of the drawbar 42. A bell crank 124 is mounted for pivoting about a fore-and-aft extending pin 126 fixed to a bracket 128. The lower end of the bell crank 124 has a slot 130 therein which receives a pin 132 carried by the right end of the locking bolt 122. An operating handle 134 projects downwardly through an opening 136 in the bracket 128 and is pivotally connected to the upper end of the bell crank 124. A spring 138 extends between the handle 134 and the bracket 128 and urges the handle downwardly, which handle in turn pivots the bell crank clockwise to keep the locking bolt 122 inserted into the opening 88. The locking bolt 122 may be withdrawn from the opening 88 by pulling up on the handle 134 to pivot the bell crank 134 clockwise. A nose 140 on the handle 134 is then positioned above the bracket 128 and the handle may then be moved slightly to the left and released, whereupon the spring 138 will urge the nose 140 into engagement with the bracket 128 to maintain the handle in the raised position and thus, hold the locking bolt 122 in its disengaged position.

The foregoing description is thought to be sufficient toward the complete understanding of the invention, and for the sake of brevity, the operation is not reiterated.

We claim:

1. A drawbar assembly in combination with a tractor having a normal direction of travel, comprising: a drawbar extending in the normal direction of travel; vehicle hitch-engaging means carried by said drawbar; connecting means securing said drawbar to said tractor for movement between first and second positions wherein said hitch-engaging means is respectively disposed in a raised towing condition and a lowered vehicle hitch-engaging condition, said second position being located downwardly and rearwardly from said first position; said connecting means including means for constrainingly guiding said hitch-engaging means along a smooth arcuate path which is concave, as viewed facing the rear of the tractor, and curves downwardly and rearwardly from the first to the second position of the hitch-engaging means and power means for moving said drawbar between its first and second positions.

2. The invention defined in claim 1 wherein said connecting means include said power means and only two pivotal connections with said drawbar.

3. The invention defined in claim 1 wherein there is a transverse opening in said drawbar, locking means supported by said tractor and including a locking bolt disposed for reciprocable movement in and out of said opening when said drawbar is in said first position and said locking means further including powered actuating means for selectively shifting said locking bolt into and out of said opening.

4. The invention defined in claim 3 wherein said actuating means includes means for automatically inserting said locking bolt into said opening in response to said drawbar being located in said first position.

5. In combination with a tractor drawbar assembly of the type including a drawbar movable between a lowered vehicle hitch-engaging position and a raised transport position, a safety lock comprising: an opening in said drawbar; a locking bolt; a fluid chamber slidably receiving said bolt in piston fashion and being fixed to dispose said bolt for reciprocal movement into and out of said opening when said drawbar is in the transport position; means biasing said bolt toward one end of said chamber and out of engagement with said opening; fluid pressure supplying means including fluid passage means connected to said one end of said chamber; said fluid pressure supplying means further including means responsive to the drawbar reaching said transport position for causing the fluid pressure to rise above a predetermined level; a first one-way check valve in said fluid passage means operative for permitting flow into said one end of said chamber, for shifting said bolt against the bias means and into the opening, only when the fluid pressure in said passage means is above said predetermined level; means for selectively connecting said fluid pressure supplying means to exhaust and a second one-way check valve in said passage means operative for permitting fluid to exhaust from said one end of said chamber to permit the bolt to be moved out of said opening by said bias means.

6. The invention defined in claim 5 wherein said means responsive includes, at least one extensible and retractable hydraulic actuator having at least one work port and being operatively connected between the tractor and the drawbar for moving the drawbar from said lowered position to said raised position when fluid pressure is applied to said work port; said pressure supply means including pump means operatively connected for selectively supplying fluid under pressure to said work port; the actuator being of such size and of such location relative to the drawbar that the pressure developed in said work port, during raising of the drawbar, normally remains below said predetermined level; stop means for engaging said drawbar when said drawbar reaches said raised position and for stopping the movement of said actuator, the actuator being selected such that said stopping causes the pressure in the work port, and consequently the pressure applied by said pressure supply means, to increase above said predetermined level, whereby the locking bolt is automatically shifted into the opening when said drawbar reaches the raised position.

7. The invention defined in claim 6 wherein said locking bolt has a cylindrical head, and wherein said chamber is cylindrical and slidably receives said head; said fluid passage means including an inlet to the end of said chamber remote from said one end, the passage of said bolt interconnecting the fluid chamber portions at the opposite sides of said head, and an outlet from said one end of the chamber, and said first and second one-way check valves being located respectively in said passage and in said outlet.

8. The invention defined in claim 7 wherein a conduit interconnects said inlet and outlet.

9. The invention defined in claim 6 wherein said opening extends transversely through said drawbar and is elongated in the direction of travel of the tractor, whereby lost motion is provided between said drawbar and the locking bolt when the locking bolt is inserted in said opening, and said hydraulic actuator being positioned so as to cushion draft loads applied to said drawbar.

10. A drawbar assembly in combination with a tractor comprising: a drawbar; vehicle hitch-engaging means carried by said drawbar; connecting means securing said drawbar to said tractor for movement between first and second positions wherein said hitch-engaging means is respectively disposed in a raised towing condition and a lowered vehicle hitch-engaging position; power means for moving said drawbar between said first and second positions; a motive force connected to said power means and normally remaining below a first force level during raising of the drawbar from said second to said first position; means causing said motive force to increase above said first force level once said drawbar reaches said first position; a transverse opening being in said drawbar; locking means supported by said tractor including a locking bolt disposed for reciprocable movement into and out of said opening when said drawbar is in said first position; actuating means for automatically inserting said locking bolt into said opening when said drawbar is located in said first position; said actuating means being connected to said motive force and including means responsive only to forces above said first force level for causing said automatic insertion of said bolt.

11. A drawbar assembly in combination with a tractor, comprising: a drawbar; vehicle hitch-engaging means carried by said drawbar; connecting means securing said drawbar to said tractor for movement between first and second positions wherein said hitch-engaging means is respectively disposed in a raised towing condition and a lowered vehicle hitch-engaging condition, said second position being located downwardly and rearwardly from said first position; said connecting means including power means for moving said drawbar between said first and second positions; said power means including at least one extensible and retractable rod fixed for horizontal fore-and-aft movement; and said drawbar being in the form of a two-armed lever having one end pivotally connected to said rod whereby said one end of said drawbar will be moved in a straight line.

12. The invention defined in claim 11 wherein said connecting means includes at least one crank having one end pivotally connected intermediate the ends of said drawbar and having the other end mounted for vertical, fore-and-aft pivoting movement about a fixed transverse axis above said drawbar; said crank and said rod being positioned in such relationship to each other and to the drawbar that said hitch-engaging means will follow a curved path when said drawbar is moved between said first and second positions by respective extension and retraction of said rod.

13. The invention defined in claim 11 wherein said power means includes a pair of parallel-arranged extensible and retractable rods disposed for horizontal fore-and-aft movement; said drawbar being pivotally connected at its forward end to the forward end of said rods for relative pivotal movement about a transverse axis, said connecting means including a pair of parallel cranks, each having one end pivotally connected intermediate the ends of drawbar and having the other end mounted for vertical fore-and-aft pivoting movement about a fixed transverse axis above said drawbar; said cranks and said rods being positioned in such relationship to each other and to the drawbar that said hitch-engaging means will follow a curved path when the drawbar moves between said first and second positions by extension or retraction of said rods.

14. A drawbar assembly in combination with a tractor, comprising: a drawbar; vehicle hitch-engaging means carried by said drawbar; connecting means securing said drawbar to said tractor for movement between first and second positions wherein said hitch-engaging means is respectively disposed in a raised towing condition and a lowered vehicle hitch-engaging condition, said second position being located downwardly and rearwardly from said first position; said drawbar being mounted for movement in the longitudinal center plane of the tractor and said connecting means includes a pair of extensible and retractable hydraulic actuators fixed to the underside of the tractor in side-by-side fore-and-aft extending relationship at the opposite sides of said longitudinal center plane; the piston rods of said actuators extending forwardly and being pivotally connected at their forward ends to the forward end of said drawbar, at least one crank having one end pivotally connected intermediate the ends of said drawbar and having the other end mounted for vertical, fore-and-aft pivotal movement about a fixed transverse axis above said drawbar; said crank and said actuators being positioned in such relationship to each other and to the drawbar that said drawbar will be held closely adjacent said actuators when the actuators are in the condition for holding said drawbar in said first position.

15. The invention defined in claim 14 wherein a second crank is disposed parallel to said one crank, and wherein a pair of transverse pins are fixed to the opposite lateral sides of the cylinders of said actuators, said one and second cranks respectively having one of their ends pivotally mounted on said pair of pins; a transverse shaft intermediate the end of and connected to said drawbar, and the other ends of said cranks being pivotally mounted on said shaft.

16. The invention defined in claim 15 wherein said hitch-engaging means includes an upwardly-opening draw hook fixed to the rear end of said drawbar, stop means positioned for engagement by said draw hook when the draw hook is moved to said first position; said drawbar, when in said first position, including a first arm extending horizontally between said draw hook and said transverse shaft and a second arm angled upwardly from said transverse shaft to the pivotal connection between the pistons and rods and the drawbar whereby sufficient working clearance is provided beneath the tractor when the drawbar is in the raised transport position.

17. The invention defined in claim 14 and further including safety means for locking the drawbar in said first position, said safety means including a transverse opening in said drawbar, said opening being elongated in the direction of travel of said tractor, locking bolt means including a locking bolt adapted for insertion into said opening when said drawbar is in said first position, said locking bolt being loosely received in said opening so as to provide lost motion in said direction of travel between the drawbar and the locking bolt and said actuator being disposed so as to cushion draft loads applied to said drawbar.

* * * * *